US012354229B2

(12) United States Patent
Querbes et al.

(10) Patent No.: US 12,354,229 B2
(45) Date of Patent: Jul. 8, 2025

(54) METHOD AND DEVICE FOR THREE-DIMENSIONAL RECONSTRUCTION OF A FACE WITH TOOTHED PORTION FROM A SINGLE IMAGE

(71) Applicants: Olivier Querbes, Vallesvilles (FR); Véronique Querbes-Duret, Vallesvilles (FR)

(72) Inventors: Olivier Querbes, Vallesvilles (FR); Véronique Querbes-Duret, Vallesvilles (FR)

(*) Notice: Subject to any disclaimer, the term of this patent is extended or adjusted under 35 U.S.C. 154(b) by 256 days.

(21) Appl. No.: 18/008,653

(22) PCT Filed: Jun. 4, 2021

(86) PCT No.: PCT/EP2021/065067
§ 371 (c)(1),
(2) Date: Dec. 6, 2022

(87) PCT Pub. No.: WO2021/245273
PCT Pub. Date: Dec. 9, 2021

(65) Prior Publication Data
US 2023/0222750 A1    Jul. 13, 2023

(30) Foreign Application Priority Data
Jun. 6, 2020 (FR) ...................... 2005928

(51) Int. Cl.
*G06T 7/50* (2017.01)
*G06T 5/20* (2006.01)
(Continued)

(52) U.S. Cl.
CPC ................ *G06T 19/20* (2013.01); *G06T 5/20* (2013.01); *G06T 5/40* (2013.01); *G06T 7/11* (2017.01);
(Continued)

(58) Field of Classification Search
CPC ... G06T 19/20; G06T 7/50; G06T 7/11; G06T 7/30; G06T 7/70; G06T 17/00; G06T 2207/30036; G06T 2207/30201
See application file for complete search history.

(56) References Cited

U.S. PATENT DOCUMENTS

2019/0035149 A1* 1/2019 Chen ................... G06V 40/166
2020/0000551 A1  1/2020 Li
(Continued)

FOREIGN PATENT DOCUMENTS

EP       3689287 A1 *  8/2020 .......... A61B 5/0088
WO   2017182654 A1   10/2017
WO   2019215550 A1   11/2019

OTHER PUBLICATIONS

Chenglei Wu et al., Model-Based Teeth Reconstruction, ACM Trans. Graph., vol. 35, No. 6, Article 220 (Nov. 2016).
(Continued)

*Primary Examiner* — Antonio A Caschera
(74) *Attorney, Agent, or Firm* — CRGO Global; Steven M. Greenberg

(57) ABSTRACT

A 3D reconstruction method for obtaining, from a 2D colour image of a human face with a visible toothed portion, a single reconstructed 3D surface of the toothed portion and of the facial portion without toothed portion includes segmenting the 2D image into a first part corresponding to the toothed portion and a second part corresponding to the facial portion without said toothed portion, enhancing the first part of the 2D image in order to modify the photometric characteristics, and generating a 3D surface of the face reconstructed from the enhanced first part of the 2D image and from the second part of the 2D image. The obtained 3D surface of the face is suitable for simulating a dental treatment, by substituting on the area of the 3D surface
(Continued)

corresponding to the toothed portion, another 3D surface corresponding to the toothed portion after the projected treatment.

17 Claims, 6 Drawing Sheets

(51) Int. Cl.
| | | |
|---|---|---|
| *G06T 5/40* | (2006.01) | |
| *G06T 7/11* | (2017.01) | |
| *G06T 7/30* | (2017.01) | |
| *G06T 7/70* | (2017.01) | |
| *G06T 17/00* | (2006.01) | |
| *G06T 19/20* | (2011.01) | |

(52) U.S. Cl.
CPC .................. *G06T 7/30* (2017.01); *G06T 7/50* (2017.01); *G06T 7/70* (2017.01); *G06T 17/00* (2013.01); *G06T 2207/10024* (2013.01); *G06T 2207/20021* (2013.01); *G06T 2207/20221* (2013.01); *G06T 2207/20224* (2013.01); *G06T 2207/30036* (2013.01); *G06T 2207/30201* (2013.01); *G06T 2207/30244* (2013.01); *G06T 2210/41* (2013.01); *G06T 2210/44* (2013.01); *G06T 2219/2021* (2013.01)

(56) References Cited

U.S. PATENT DOCUMENTS

2020/0105028 A1* 4/2020 Gao .................. A61C 13/0004
2020/0342586 A1* 10/2020 Kumar .................. G06T 7/136

OTHER PUBLICATIONS

Yu Deng et al., Accurate 3D Face Reconstruction with Weakly-Supervised Learning: From Single Image to Image Set, 2019 IEEE/CVF Conference on Computer Vision and Pattern Recognition Workshops (2019).

* cited by examiner

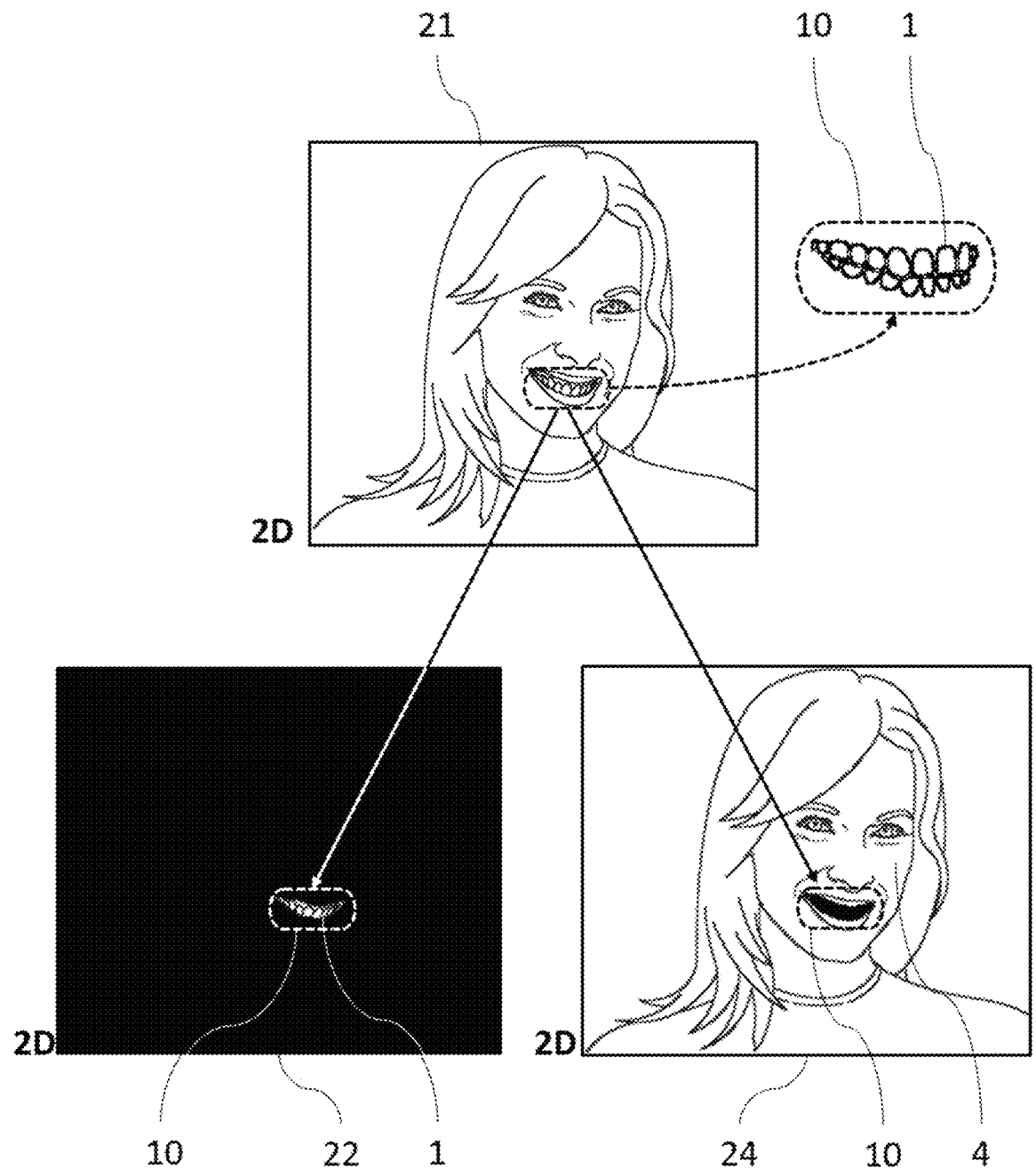

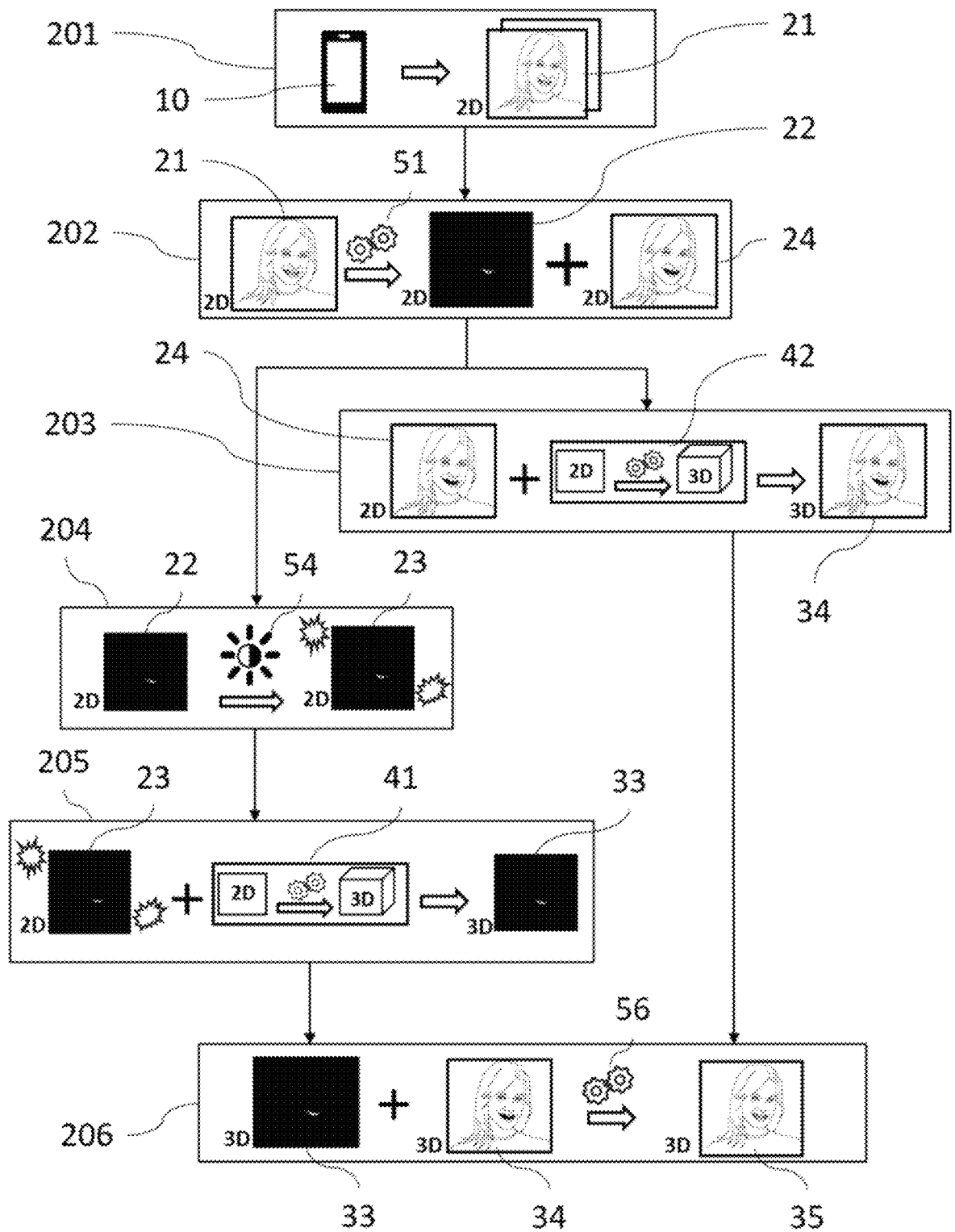
[Fig. 2]

[Fig. 3]
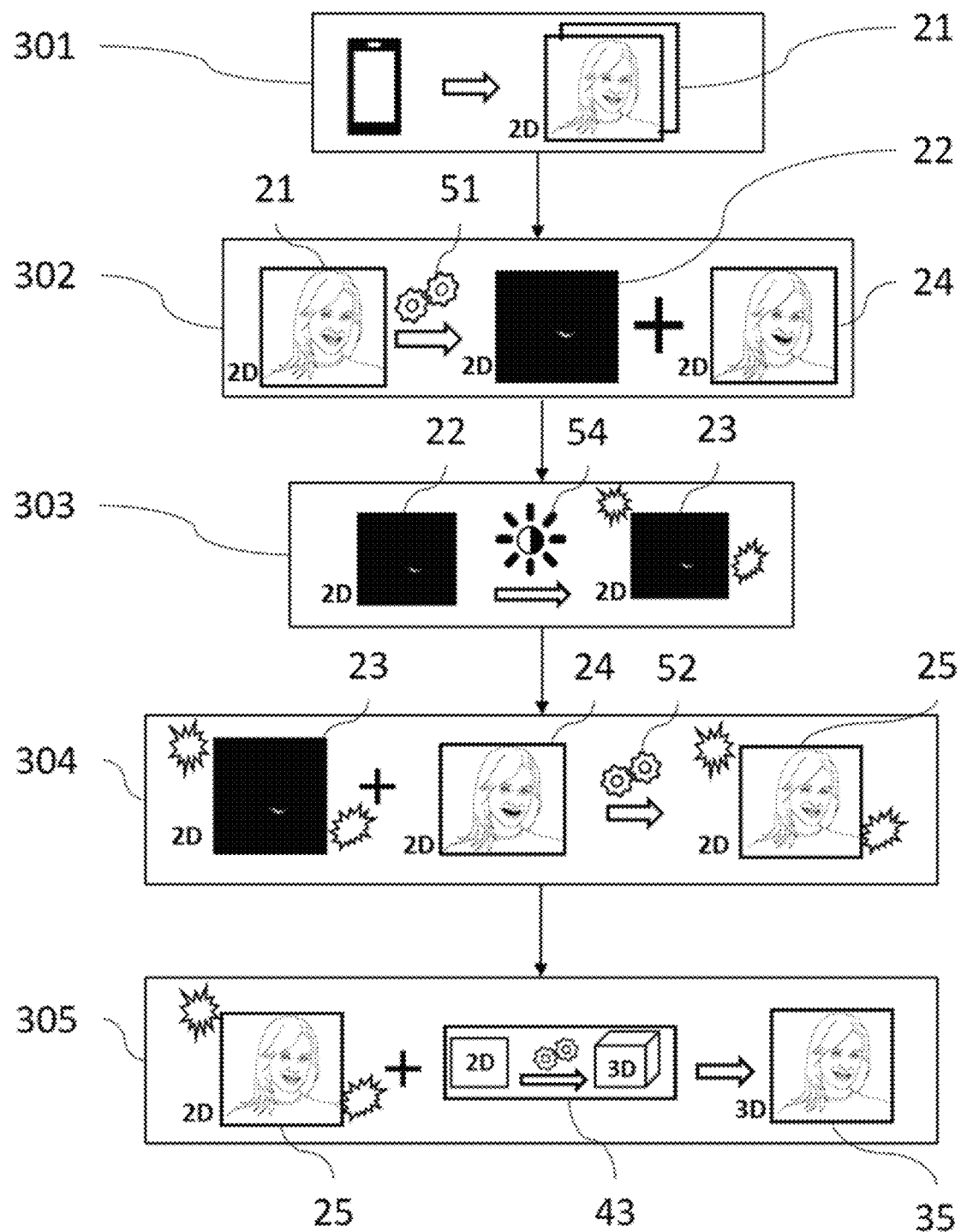

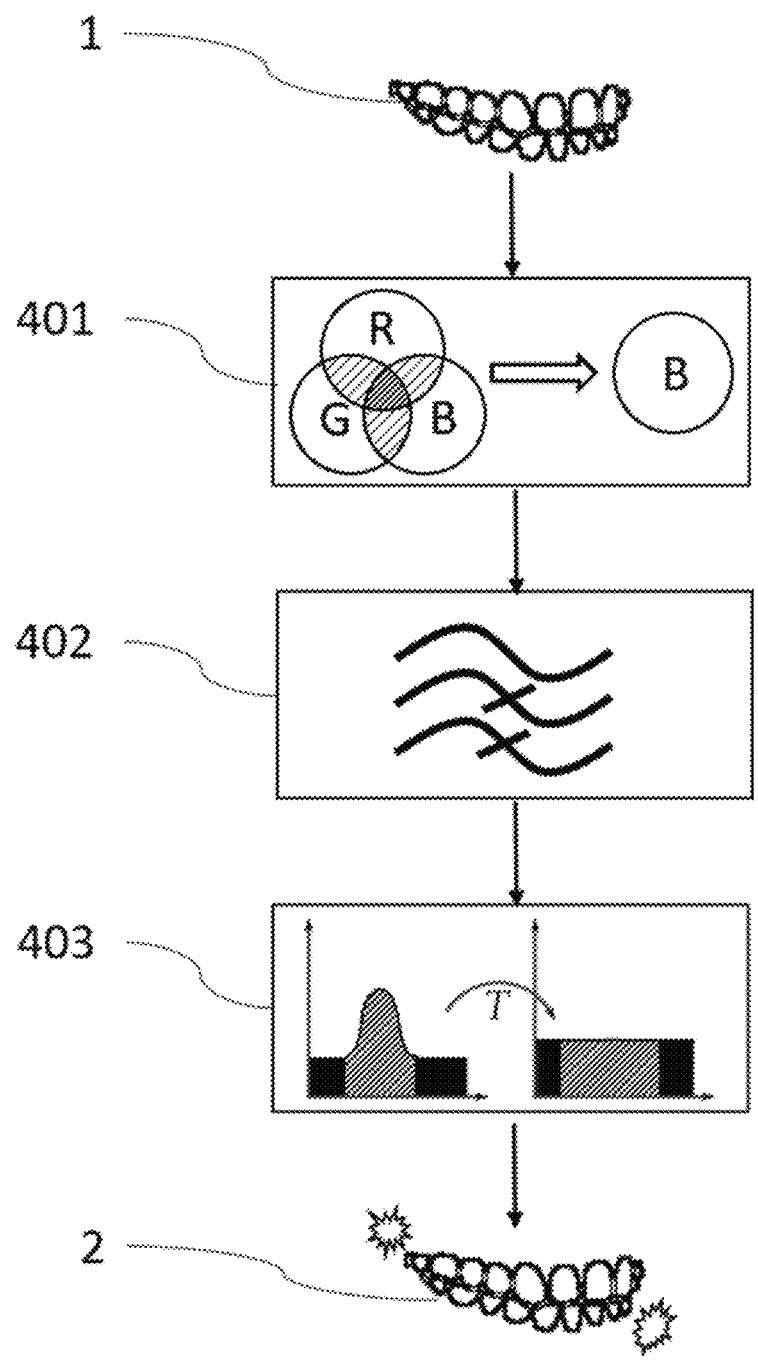

[Fig. 5]
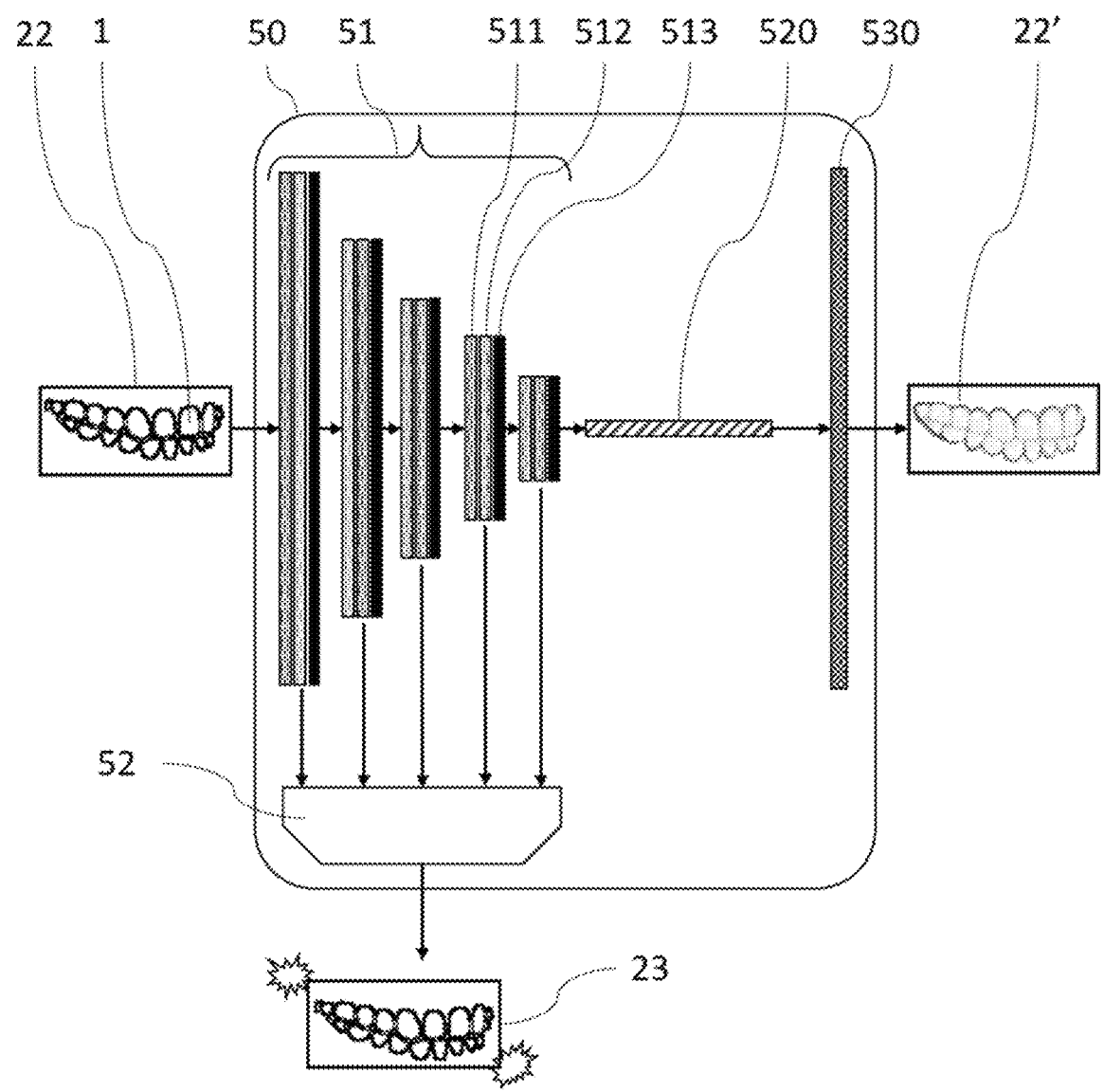

[Fig. 6]
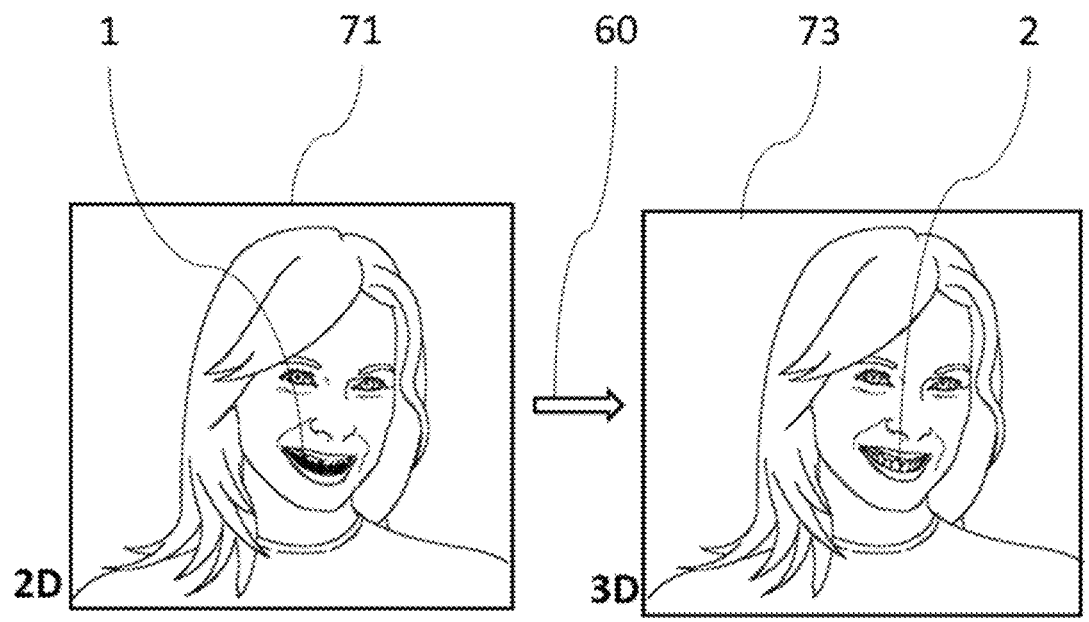
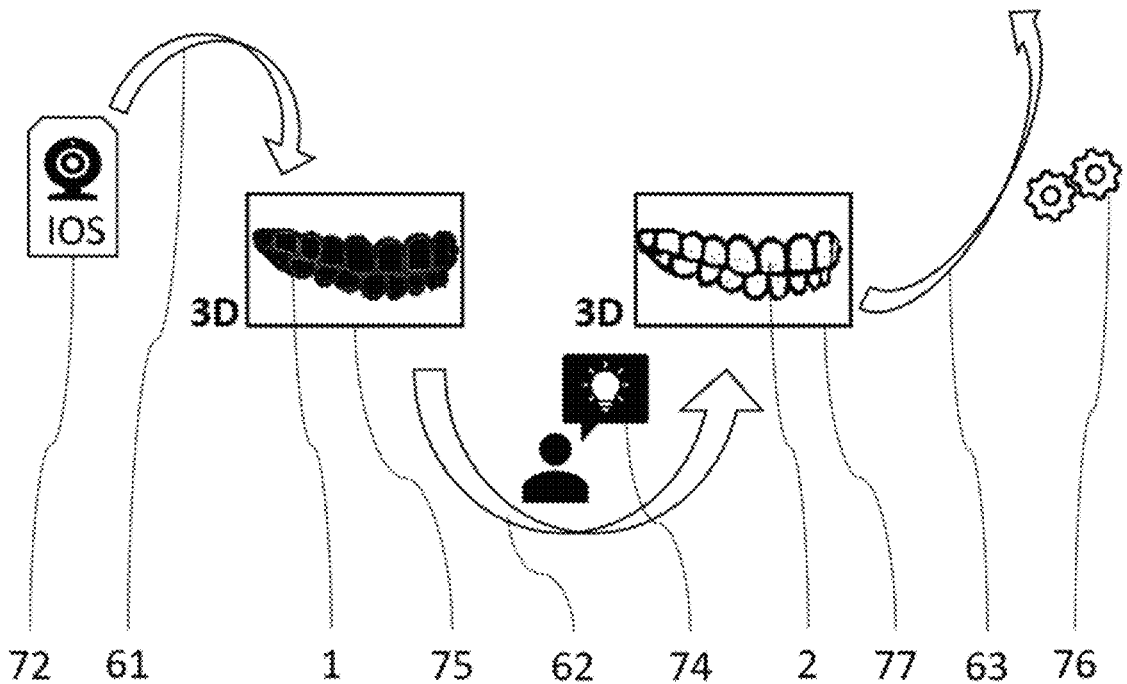

METHOD AND DEVICE FOR THREE-DIMENSIONAL RECONSTRUCTION OF A FACE WITH TOOTHED PORTION FROM A SINGLE IMAGE

CROSS-REFERENCE TO RELATED APPLICATIONS

This application is a § 371 national phase entry of International Application No. PCT/EP2021/065067, filed Jun. 4, 2021, which claims priority to French Patent Application No. 2005928 filed on Jun. 6, 2020.

TECHNICAL FIELD

The present invention relates in general to three-dimensional facial reconstruction, and more particularly to a method and to a device for three-dimensional reconstruction of a face having a toothed portion, from a single image, as well as to a computer program product implementing the method.

The invention finds application, in particular, in digital processing techniques in the field of dentistry.

It also proposes, furthermore, a method for simulating the aesthetic result of a projected dental treatment for a human subject, from at least one two-dimensional (2D) color image of the face of the subject with a visible toothed portion. The projected dental treatment may be aesthetic, orthodontic or prosthetic.

PRIOR ART

Three-dimensional (3D) facial reconstruction is a growing field with highly varied applications. Until recently used mainly in the field of audiovisual production, it is now finding other applications, in particular in the simulation of aesthetic treatments.

Among the aesthetic treatments, mention may be made of dental treatments (whitening teeth, affixing veneers onto teeth, dental realignment, prosthetics, etc.). For these treatments, the patient must often start the treatment without being able to judge for their self in advance the aesthetic result that this treatment will produce. They leave themselves in the hands of the practitioner's expertise. The need exists to be able to give the patient the benefit and advantages of a simulation that can realistically present the aesthetic result of this type of treatment before its actual start, in order to potentially choose to modify the projected treatment, in consultation with the practitioner.

Certain facial reconstruction techniques already exist. However, most of these techniques are based either on technologies that are intensive in digital processing, that is intensive in terms of the processing time and computing resources necessary to execute a reconstruction algorithm, or in terms of hardware. Other techniques are based on the acquisition of several passive 2D images in order to be able to work in photogrammetry. However, many commercially available devices include only one 2D sensor, which complicates the use of this type of algorithm.

Certain technical solutions can meet the need expressed above, in particular by virtue of artificial intelligence (AI). Increasingly evolved deep learning networks make it possible to reconstruct the face in 3D, from a single 2D image, with increasingly realistic rendering. Unfortunately, the toothed portion very often remains an element inaccessible to deep learning algorithms due to their particular nature, that is to say very specular and not very textured.

In the Article by Wu et al., "*Model-based teeth reconstruction*", ACM Transactions on Graphics 35, Article number 220, pp. 1-13, November 2016, the authors disclose a parametric solution for the reconstruction of the toothed portion. However, that solution is compatible only with calibrated sensors. Due to its parametric nature, however, it does not apply to teeth that deviate only within a certain extent from a standard tooth.

Document US2018174367A discloses an augmented reality display system of a model making it possible to directly see the simulated result of a planned dental treatment, while also offering the possibility of interacting with this model in order to modify it in real time. The system operates by acquiring video data (therefore relating to a plurality of images), simulating dental processing on these video data, and rendering the result in augmented reality. If a 3D scan of the toothed portion is available, it can be registered on an image, with or without the simulation of the envisaged treatment. Otherwise, a simulation can be made based on video data, however with a twofold drawback of the need to have two image sensors, on the one hand, and a coarse simulation result, on the other hand.

Document US2018110590A discloses a simulation method wherein a dental arch is digitized in 3D on which it is envisaged to apply a dental treatment (placing braces, crowns, aligners, etc.), then, in an augmented reality system, the 3D dental arch comprising the simulation of the projected dental treatment on the real image of the patient that is in 2D, with the aim of viewing in this system not the actual dental arch of the patient, but rather this arch with the result of the projected dental treatment. However, the method of aligning the 3D data of the modified arch in the 2D space of the real image of the patient is not explained, this method seems insufficiently described to be able to be reproduced by a person skilled in the art.

DISCLOSURE OF THE INVENTION

The invention aims to allow for the facial reconstruction, i.e., 3D reconstruction, of the face of a human subject with a visible toothed portion, from a series of any 2D images or possibly from any single 2D image of the face with the toothed portion, the 3D reconstruction thus obtained lending itself well to the overlaying in the 3D domain of the result of the simulation of a projected dental treatment which modifies the toothed portion.

This aim is achieved by means of a method comprising the separation of the 2D image from the face into a part corresponding to the toothed portion alone and another part corresponding to the rest of the face, the first part being subjected to digital enhancement processing before being merged with the second, either at the 2D level or in the 3D level. The 3D reconstruction, or 3D surface, thus obtained is adapted for the simulation of a projected dental treatment to be applied to the toothed portion of the face, by substituting, on the area of the 3D surface corresponding to said toothed portion, another 3D surface corresponding to said toothed portion as it would be after said projected treatment.

More specifically, disclosed is a three-dimensional (3D) reconstruction method for obtaining, from at least one two-dimensional (2D) color image of a human face with a visible toothed portion, a single reconstructed 3D surface of the toothed portion and of the facial portion without toothed portion, said method comprising:

segmenting the 2D image into a first part corresponding to the toothed portion of the face only by masking in the 2D image of the facial portion without toothed portion of the face, on the one hand, and a second part corresponding only to the facial portion, without said toothed portion, of the face by masking in the 2D image the toothed portion of the face, on the other hand;

enhancing the first part of the 2D image to modify the photometric characteristics;

generating a 3D surface of the face reconstructed from the enhanced first part of the 2D image, on the one hand, and from the second part of said 2D image, on the other hand, said 3D surface of the face being adapted for the simulation of a projected dental treatment to be applied to the toothed portion of the face, by substituting, on the area of the 3D surface corresponding to said toothed portion, another 3D surface corresponding to said toothed portion after said projected treatment, said generating of the 3D surface of the face comprising:

the implementation of a first deep learning algorithm adapted to produce a 2D depth map representing a 3D reconstruction of the toothed portion of the face based on the first part of the enhanced 2D image;

the implementation of a second facial reconstruction deep learning algorithm, adapted to produce a textured 3D reconstruction of the facial portion without the toothed portion of the face based on the second part of the 2D image; and, an algorithm for merging the 3D reconstruction of the toothed portion and the textured 3D reconstruction of the facial part of the 2D image of a 2D image, to obtain the 3D surface of the face with its toothed portion.

The embodiments use the enhanced 2D image (or the images) as relates to the toothed portion, in order to produce a facial 3D reconstruction, with the toothed portion, of the subject's face. It is the enhancement of the toothed portion of the image of the patient's face which makes the 3D reconstruction not only of the facial part (without the toothed portion) but also of the toothed portion itself, from a single 2D image of the face with this visible toothed portion.

This first embodiment provides for the facial reconstruction to be decoupled from that of the toothed portion. In this first embodiment, the generation of the 3D surface of the face may comprise:

the implementation of a first deep learning algorithm adapted to produce a 2D depth map representing a 3D reconstruction of the toothed portion of the face based on the first part of the enhanced 2D image;

the implementation of a second facial reconstruction deep learning algorithm, adapted to produce a textured 3D reconstruction of the facial portion without the toothed portion of the face based on the second part of the 2D image; and, an algorithm for merging the 3D reconstruction of the toothed portion and the textured 3D reconstruction of the facial part of the 2D image of a 2D image, to obtain the 3D surface of the face with its toothed portion;

In this first embodiment, the second deep learning algorithm can be based on a method of the method of generating 3D pose via a 3D morphable model (3DMM) adapted to deform a generic 3D surface so as to approximate the photometric plane of the 2D image.

Where applicable, the first deep learning algorithm can be adapted to predict a depth map for the toothed portion of the face from training data by masking a depth map associated with the 2D image with the same mask as a mask used on the 2D image to obtain the first part of the 2D image corresponding to the toothed portion of the face, and the depth map for the toothed portion may be converted into a 3D reconstruction that is merged with the 3D reconstruction of the facial portion without the toothed portion to produce the 3D surface of the face.

The second algorithm can furthermore be adapted to produce the relative 3D position of the camera that took the picture of the face as presented on the 2D image as well as an estimation of the 2D area of said 2D image wherein the toothed portion of the face is located, such that a consolidated 3D surface of the face can be obtained from a plurality of 2D images of the face taken by a camera according to different respective viewing angles and for each of which the steps of the method are repeated to obtain respective reconstructed 3D surfaces, said reconstructed 3D surfaces then being combined using the relative 3D position of the camera that took the picture of the face as presented on each 2D image as well as the estimation of the 2D area of said 2D image wherein the toothed portion of the face is located.

A second embodiment provides that the 3D reconstruction of the facial part without the toothed portion and that of the toothed portion are carried out by one and the same algorithm. In this implementation, the generating of the 3D surface of the face can comprise the implementation of a third deep learning algorithm, adapted to produce overall a 3D reconstruction of the toothed portion and of the facial portion without the toothed portion based on the second part of the 2D image to which the first part of said enhanced 2D image is added with mutual registration of said second part of the 2D image and of said first part of said enhanced 2D image.

Embodiments taken alone or in combination further provide that:

the third deep learning algorithm can be based on a method of generating 3D pose via a 3D morphable model or 3DMM suitable for deforming a generic 3D surface so as to come closer to the photometric plane of the second part of the 2D image to which the first part of said enhanced 2D image is added;

the modification of the photometric characteristics of the first 2D part of the image can comprise increasing the sharpness and/or increasing the contrast of said first part of the 2D image;

the enhancement of the toothed portion of the 2D image can be carried out using a series of purely photometric filters;

the 2D enhancement processing comprises the extraction of the blue channel, a high-pass contrast enhancement filtering applied to the extracted blue channel, and also a local histogram equalization filtering, for example of the CLAHE type, applied to the filtered blue channel, the high-pass contrast enhancement filtering applied to the blue channel may comprise an algorithm to increase sharpness, consisting for instance of partially subtracting from said blue channel a blurred version of itself;

in one variant, the first part of the enhanced 2D image may be produced from the original 2D image as an intermediate output of a semantic segmentation deep learning network, having a higher contrast than the original 2D image, and selected based on a determined quantitative criterion;

a contrast metric may be associated with the output of the convolution kernel of each of the convolution layers of the semantic segmentation deep learning network, and the selected intermediate output of the semantic segmentation deep learning network may be the output demonstrating the highest contrast with respect to the metrics associated with the respective intermediate outputs of said deep semantic segmentation network.

In a second aspect, the invention also relates to a device having means suitable for executing all the steps of the method according to the first aspect above.

A third aspect of the invention relates to a computer program product comprising one or more sequences of instructions stored on a memory medium readable by a machine comprising a processor, said sequences of instructions being adapted to carry out all the steps of the method according to the first aspect of the invention when the program is read in the memory medium and executed by the processor.

In a fourth and final aspect, the invention also relates to a method for simulating the aesthetic result of a projected dental treatment for a human subject, for example an aesthetic, orthodontic or prosthetic treatment, from at least one two-dimensional (2D) color image of the face of the subject with a visible toothed portion, said method comprising:
  three-dimensional (3D) reconstruction, from the 2D image, of the face with the toothed portion, to obtain a single reconstructed three-dimensional (3D) surface of the toothed portion and of the facial portion without the toothed portion by the method according to the first aspect;
  the substitution on the area of the 3D surface corresponding to the toothed portion of the face of another 3D surface corresponding to said toothed portion after said projected treatment; and,
  displaying the 3D surface of the face with the toothed portion after the projected dental treatment.

Embodiments taken alone or in combination further provide that:
  the method comprises implementing an algorithm applied to a 3D reconstruction of the total dental arch of the subject, said algorithm being adapted to register the dental arch onto the toothed portion of the 3D surface of the face as obtained by the method according to the first aspect, and to replace the toothed portion within said 3D surface of the face with a corresponding portion of said 3D reconstruction of the subject's dental arch, that is, by the portion of the subject's dental arch that is visible in the 2D image;
  the dental arch may undergo digital processing, either automatic or manual, before registration on the toothed portion of the 3D surface of the face, in order to simulate, within said 3D surface of the face, the aesthetic result of the projected treatment;
  the 3D reconstruction of the subject's dental arch can be obtained with an intraoral camera; and/or
  the projected treatment may comprise at least one of the list of following aesthetic, orthodontic or prosthetic treatments: a change in hue of the teeth, a realignment of the teeth, an affixing of veneers onto the teeth, a placement of orthodontic material such as braces, or a placement of prosthetic material such as a crown, a bridge, an inlay-core or an inlay-onlay.

DESCRIPTION OF DRAWINGS

Other features and advantages of the invention will become apparent on reading the description which follows. This is purely illustrative and should be read in conjunction with the accompanying drawings, in which:

FIG. 1 is a functional diagram illustrating the segmentation, according to the method of the first aspect of the invention, of a 2D color image of a human face with a visible toothed portion, in a first part corresponding to the toothed portion of the face only and a second part corresponding to the facial portion, without said toothed portion, of the face;

FIG. 2 is a diagram of steps of a first embodiment of the method making it possible to obtain a 3D reconstruction from the 2D image of FIG. 1, wherein the 3D reconstruction is carried out separately for each of the first and second parts of the 2D image, after enhancement of the first part and before merging the 3D level of the resulting 3D reconstructions;

FIG. 3 is a diagram of steps of a first embodiment of the method making it possible to obtain a 3D reconstruction from the 2D image of FIG. 1, wherein the 3D reconstruction is carried out together for each of the first and second parts of the 2D image, after enhancement of the first part and before merging the two parts on the 2D level;

FIG. 4 is a functional diagram illustrating a first enhancement method of the toothed portion of the face of the 2D image, using a processing that implements a series of photometric filters;

FIG. 5 is a functional diagram illustrating a second enhancement method of the toothed portion of the face of the 2D image, exploiting the progress of artificial intelligence by using an intermediate output of a deep learning network; and, FIG. 6 is a functional diagram illustrating an example implementation of the simulation method according to the fourth aspect of the invention, wherein the projected treatment is a whitening of teeth.

DESCRIPTION OF THE EMBODIMENTS

In the description of embodiments which will follow and in the figures of the accompanying drawings, the same or similar elements bear the same reference numerals in the drawings.

The invention draws advantage of deep learning architectures such as deep neural networks and convolutional neural networks or CNNs to produce three-dimensional reconstructions from one (or more) 2D image(s) of a human face which comprises a visible toothed portion, acquired by an acquisition device comprising a single 2D image sensor.

Before beginning the description of detailed embodiments, it seems also useful to specify the definition of certain expressions or terms that will be used therein. Unless otherwise arranged, these definitions apply notwithstanding other definitions that a person skilled in the art can find in certain works of the specialized literature.

An "image" or "view", or "scan" is constituted by a set of points of the real three-dimensional scene. For a 2D image acquired by an image acquisition device, or imaging device (for example a CCD sensor or a CMOS sensor), the points concerned are the points of the real scene projected in the plane of the focal length of the 2D sensor used to acquire the 2D image, and are defined by the pixels of the 2D image. For a reconstructed 3D surface (also called "3D reconstruction"), this term refers to the product or result of the 3D reconstruction processing, the points concerned being a 3D point cloud obtained by a transformation of a "depth map" (see definition given below), or by triangulation in the case of stereoscopy, or else by 3D deformation of a generic 3D model in the case of a 3DMM type method (see definition given below). Such a cloud of points defines a skeleton of the three-dimensional scene. A 3D mesh of this point cloud, for example a triangulated 3D point mesh, can define an envelope.

A "monocular" image acquisition device is a device having only one image sensor and capable of acquiring images of a three-dimensional scene only from a single viewing angle only at a position of the given device.

"Registration" consists in determining the spatial relationship between two representations (2D image or 3D surface) of the same object so as to superimpose the representations of the same physical point.

The "pose calculation" is the estimating of the position and orientation of the imaged scene relative to the imager (image sensor). It is one of the fundamental problems in computer vision, often called "Perspective-n-Points" (PnP). This problem consists in estimating the pose (2-tuple [$R_j$; $t_j$] formed of the rotation matrix $R_j$ and translation vector $t_j$) of the camera relative to an object in the scene, which amounts to finding the pose that makes it possible to reduce the reprojection error between a point of the space and its 2D equivalent in the image. A more recent approach, called ePNP for "Efficient Perspective-n-Point", assumes that the camera is calibrated, and takes advantage of doing away with the calibration problems by normalizing the 2D points by multiplying them by the inverse of the intrinsic matrix. This approach adds to this the fact of setting the pose of the camera by passing through 4 control points, ensuring that the estimated transformation is rigid. Doing this thus makes it possible to shorten the calculation times.

"Enhancement" of the toothed portion means processing at a 2D level specific to the toothed portion aimed at improving the photometric characteristics of said toothed portion. In embodiments, this processing specific to the toothed portion may comprise applying a sequence of image processing filters. In other embodiments, it comprises the use of an intermediate output of a learning network.

A "sharpening" algorithm is an image processing algorithm aimed at increasing the sharpness of the image.

The acronym "3DMM" (for 3D Morphable Model) designates a method for generating 3D pose via a 3D morphable (that is modifiable) model. This method is particularly suitable for the treatment of the facial information of a human being (skin, wrinkles, illumination, relief, etc.). The 3DMM method consists of affixing a 3D face (mask) to the 2D image, and to modify it to match it with a face on the 2D image. The information corresponding to the modified mask which will make it possible to create the 3D representation of the face of the 2D image is then extracted.

A "depth map" associated with a 2D image, is a 2D representation form of the reconstructed 3D information, corresponding to the portion of the 3D scene reprojecting in the 2D image. In practice, it involves a set of values, coded in the form of levels (or shades) of grey, respectively associated with each pixel $p_i$ the 2D image: the greater the distance between the point of the three-dimensional scene and the plane of the 2D image, the darker the pixel.

A Convolutional Neural Network (or CNN) is a type of feed-forward artificial neural network consisting of a multilayer stack of perceptrons, the purpose of which is to preprocess small amounts of information. A CNN consists of two types of artificial neurons, arranged in "strata" or "layers" successively processing the information:
  the processing neurons, which process a limited portion of the image (called "receptive field") through a convolution function; and,
  the (total or partial) pooling neurons of the outputs, called pooling neurons, which make it possible to compress the information by reducing the size of the intermediate image (often by sub-sampling).

The set of outputs of a processing layer makes it possible to reconstitute an intermediate image, which serves as a basis for the next layer. Non-linear and point correction processing may be applied between each layer to improve the relevance of the result. CNNs currently have wide applications in the field of image recognition.

With reference to FIG. 1, the embodiments of the method of the invention comprise segmenting the two-dimensional (2D) image 21 of the face of a human subject, here a young woman, into a first part 22, on the one hand, and into a second part 22, on the other hand. The first part 22 corresponds only to the toothed portion 1 of the face, which is visible in the image 21. It is obtained by masking and blacking out, in the image 21, the facial portion 4 without the toothed portion 1 of the face. The second part 23 corresponds only to the facial portion 4, without the toothed portion 1, of the face. It is obtained by masking and blacking out said toothed portion 1 of the face in the 2D image.

The toothed portion 1 is shown in FIG. 1 in detail 10 of the image 21, which corresponds to the area of the mouth of the subject, that zone also being identified by the same reference 10 in the part 22 and in the part 23 of the image 21. The person skilled in the art will understand that the toothed portion excludes the lips and the gums, in order to only comprise the portion visible in the image 21, where appropriate, from the upper arch and/or the lower arch of the person's dentition. This toothed portion has, relative to the rest of the face, a high specularity and a particular texture which make 3D reconstruction difficult with conventional 3D facial reconstruction techniques.

This segmentation of the 2D image into two parts makes it possible to implement image processing specific to the toothed portion 1 which is the only object of the first part 22, in order to offset the poor photometric properties of said toothed portion 1 relative to the other portions of the face. The image processing is adapted to raise these properties, in particular the contrast. Such a treatment is designated by the term "enhancement". It is only applied to the toothed portion 1, i.e., only to the part 22 of the image 22 of the face. The toothed portion after enhancing and the facial part out of the toothed portion are then fused, that is recombined to ultimately give the 3D reconstruction of the two-dimensional image 21 of the face with toothed portion.

There are essentially two embodiments, depending on whether the above fusion is performed at the 2D level, that is before a 3D reconstruction applied to the reconstituted image, or that the merging is performed at the 3D level, that is, after 3D reconstructions applied to both parts of the image, respectively. These two embodiments will now be described with regard to the diagrams of steps of FIG. 2 and of FIG. 3, respectively.

First reference to the step diagram of the FIG. 2, the method begins, in step 201, by acquiring at least one image (i.e., of a 2D view) of the face of a subject which comprises a visible toothed portion. This is the case, in particular when the subject smiles. A smile is the result of a natural expression of emotion, which may also be controlled by the subject. In general, smiling uncovers all or part of the upper dental arch, and generally also of the subject's lower arch, due to the mouth opening and the lips stretching as a result of the smile. The image 21 of the smiling subject can be taken by the subject on their own or by another person using for example the built-in camera of a portable device of the subject such as their mobile telephone, or by any other similar imaging device, for example a camera, a webcam, etc. In embodiments, step 201 comprises taking a plurality of images of the patient's face as the image 21, taken under different respective viewing angles. These embodiments, to which we will return later, make it possible to improve the precision of the 3D reconstruction of the subject's face.

In step 202, the image 21 is segmented into a first part 22 and a second part 24. As explained above with reference to FIG. 1, the first part 22 corresponds to the toothed portion 1 of the face only. The second part 24 corresponds only to the facial portion 4, without said toothed portion 1, of the face. This segmentation step 202 can be carried out by digital processing applied to the data of the image 21, via an algorithm 51 which implements the detection of external boundaries of the toothed portion 1 of the face by virtue of a deep learning network for detecting characteristic points on a face. This makes it possible to generate a mask for both said first and second parts 22 and 24, respectively, of the image 21. The effect of these masks is as follows:

the first part 22 of the image 21 is obtained from said image 21 by masking, that is by blacking out the facial portion 4 outside the toothed portion of the face; and, the second part 24 of the image 21 is obtained from said image 21 by blacking out the toothed portion 4 of the face.

In fact, what are called the parts 22 and 24 of the image 21 are 2D images each corresponding to said image 21 but wherein some of the pixels are replaced by black pixels.

This technique is known per se and its implementation is within the abilities of the person skilled in the art, which is why it will not be described in more detail in the present description. It will be noted simply that the deep learning network of the algorithm 51 is, in particular, suitable for excluding the lips and the gums from the first part 22, so that said part only comprises the toothed portion 1 strictly speaking, the specularity and texture of which are very different from those of the organic tissues, whether soft or hard, such as the skin, the lips, or the mucous membranes of the mouth. An example of such a deep learning network is described in the article Bulat et al. "*How far are we from solving the 2D & 3D face alignment problem*? (and a dataset of 230,000 3D facial landmarks)", ICCV, 2017. The described algorithm finds characteristic points distributed along the lips. By isolating the part of the image inside these points, the toothed portion is isolated.

In step 203, the implementation of a facial reconstruction algorithm is carried out which can also be implemented in the form of a deep learning network 42. This CNN is adapted to predict a textured 3D reconstruction 34 of the facial portion 4 without the toothed portion 1 of the face. This reconstruction is obtained on the basis of the second part 24 of the image 21.

In embodiments, the algorithm 42 is based for example on the concept of 3DMM (3D Morphable Model), whereby the 3D surface corresponding to the three-dimensional reconstruction of any face can be obtained by deformation of a mean face, the deformation being parameterized by a vector comprising a number K face of real values.

More particularly, the deep learning network 42 has been trained to be capable of predicting, given a 2D image provided at the input, the set of K face parameters that deform the mean 3D model of the face so that it resembles as much as possible, on the photometric plane, the face of the 2D image provided at the input. In other words, the algorithm implemented by the deep learning network 42 implements a 3DMM method adapted to deform a generic 3D surface so as to approximate the 2D image on the photometric plane. To best approximate the 2D image, the algorithm may be based on a metric proximity metric between the deformed 3D model and the initial 2D image, in connection with an optimization process based on this metric. The training of this network 42 is done from 2D images of faces whose 3D surface is also known by means of spatially precise means (for example a structured light facial scanner).

Various examples of such algorithms are known to a person skilled in the art. Mention may be made, for example, of the algorithm described in the article by Deng et al. "*Accurate 3D face reconstruction with weakly supervised learning: from single image to image set*", IEEE Computer Vision and Pattern Recognition Workshop (CVPRW) on Analysis and Modeling of Faces and Gestures (AMFG), 2019.

It will be noted that, further to the three-dimensional surface 34 of the face (without the toothed portion), the learning network 42 is also adapted to also predict an illumination model (represented by 9 parameters) and a pose (represented by 6 parameters), which make it possible to estimate the relative 3D position of the camera that took the picture of the face as presented in the 2D image provided at the input. This pose estimate may advantageously be used when employing the method with several input 2D images, which will be explained below.

The usage limit of this type of deep learning algorithm is that it cannot predict a plausible reconstruction of the toothed portion 1, due to the photometric nature (very specular, not very textured) thereof. This is why the invention proposes to bypass this problem, by increasing the toothed portion 1 of the 2D images in order to make it usable on the photometric plane in order to perform a satisfactory three-dimensional reconstruction.

Indeed, step 204 comprises the application of a digital processing 54 to the data of the first part 22 of the image 21, which corresponds to the toothed portion 1 of the subject's face. This processing 54 comprises an enhancement of the first part 22 of the image 21 in order to modify the photometric characteristics of this first part. Essentially, this enhancement aims to improve the contrast of the image 22. The processing 54 therefore makes it possible to generate an enhanced version 23 of the image 22 corresponding to the toothed portion of the face. Two embodiments of the enhancement will be described below, with reference to FIG. 4 and to FIG. 5, respectively.

In step 205, another deep learning algorithm 41 is implemented, adapted to produce a depth map (in the 2D domain) of the toothed portion 1 of the face based on the enhanced image 23 corresponding to the first part 22 of the two-dimensional image 21. In one embodiment, the deep learning algorithm 41 is adapted to predict a depth map for the toothed portion of the face from training data, by masking a depth map associated with the image 21 with the same mask as a mask used on the image 21 in order to obtain, in step 202, the first part 22 of the image 21 corresponding to the toothed portion 1 of the face. This depth map for the toothed portion 1 of the face is then converted into a 3D reconstruction.

In embodiments, the deep learning algorithm 41 may implement a particular example of CNN, which is in fact an FCN (Fully Convolutional Network) inspired by the article by J. Long, E. Shelhamer et T. Darrell, "Fully convolutional networks for semantic segmentation", IEEE Conference on Computer Vision and Pattern Recognition (CVPR), Boston, MA, 2015, pp. 3431-3440. Such a deep learning network is specifically trained to produce a depth map of the toothed portion 1. It takes as input 2D images whose toothed portion 1 is isolated as described above in connection with step 202 (the rest of the image being masked and blacked out) and then enhanced by the processing 54 as explained above in connection with step 204. At the output, deep learning network predicts the expected depth map on the toothed portion 1, generated from the training data of the network by masking the global depth map with the same mask used on the 2D image in the enhancement step 204.

Step 206 then comprises the implementation of an algorithm 56 for merging the three-dimensional reconstruction 23 of the toothed portion 1 and the textured three-dimensional reconstruction 34 of the facial portion 4 of the face represented by the two-dimensional image 21, in order to obtain the three-dimensional reconstruction 35 of the complete face, with its toothed portion 1. In other words, in step 206, the three-dimensional reconstruction 33 corresponding to the depth map produced by the algorithm 41 for the toothed portion 1 of the face is merged with the three-dimensional reconstruction 34 obtained by the algorithm 42 for the facial portion without the toothed portion of the face, in order to produce the three-dimensional surface 35 of the complete face.

The merging algorithm 56 can here again implement a deep learning network.

For the training of this network, a database must be constructed, with n-uplets of data acquired for different persons, and which associate, for each 2D image of a person, thus the 3D surface of their face and of the toothed portion.

More particularly, to construct a triplet of training data, the 2D image of each person can be acquired by any apparatus on the market (camera, mobile phone, digital tablet, etc.). For the 3D reconstruction of the facial portion 4 of the face without the toothed portion, it is possible to use a 3D scan of facial reconstruction by structured light. Furthermore, for the toothed portion 1 which is not or which would be poorly imaged by this type of apparatus, a 3D reconstruction can be obtained by a true-color intra-oral scanner (for example a WoW™ scanner available from the company BIOTECH DENTAL), thus producing a complete, textured, precise 3D dental arch. It will be noted that such a scanner can restore the texture of the teeth by amalgamating the colors of the 2D images (coded by an RGB coding, for example) that were used for the 3D reconstruction. It is then easy to re-texture the 3D model using not the raw 2D images, but images enhanced by the algorithm 54 of step 204 of the method. The 3D model then has a much more contrasted surface and better suited to subsequent image processing algorithms based on photometry, which may ultimately be implemented in the context of the usage which is made of facial reconstructions that are obtained by virtue of the method of the invention, for example for simulating the aesthetic effect of a projected dental treatment.

In the training data triplets, the 3D reconstruction of the part of the image corresponding to the toothed portion 1 of the face, enhanced or textured in RGB depending on how it is to be used, is manually registered on the 3D reconstruction of the facial portion 4 of the face, in order to produce a single 3D reconstruction comprising the facial portion 4 and the toothed portion 1 of the face. Finally, the relative pose of the 2D image in relation to the 3D reconstruction can be calculated semi-automatically, by choosing 3D points of interest on the 3D surface as well as their corresponding points on the 2D image. By virtue of these pairs, a relative pose algorithm, for example ePNP, makes it possible to find the pose. By this method, triplet learning data is obtained {2D image; 3D reconstruction; pose}. These training data can easily be converted into other triplets {2D image; depth map; pose}, the depth map being preferred in certain embodiments.

By virtue of the deep learning network 56 trained as has just been explained, the 3D surface of the face generated in step 206 of the method from the enhanced version 23 of the first part 22 of the 2D image, on the one hand, and the second part 24 of said 2D image, on the other hand, is a good quality 3D reconstruction included for the toothed portion 1 of the face. This 3D reconstruction is therefore adapted for the simulation of a projected treatment to be applied to the toothed portion of the face, by substituting, on the area of the 3D surface corresponding to said toothed portion, another 3D surface corresponding to said toothed portion as it would be after said projected treatment.

In summary, the enhanced image 23 corresponding to the part 22 of the input image 21 which corresponds to the toothed portion 1 of the face, is used by the deep learning algorithm 41 in order to produce a three-dimensional reconstruction 33 of the toothed portion 1 of the face in the image 21. At the same time, the deep learning algorithm 42, which is for example based on a 3DMM method, generates a three-dimensional reconstruction 34 of the facial portion 4 alone. Such an algorithm, for example, is advantageously suitable for, furthermore, producing the relative 3D position of the camera that took the picture of the face as presented in the 2D image, as well as an estimation of the 2D area of said 2D image wherein the toothed portion of the face is located. This can be exploited, in certain implementations of the method, to obtain in step 206 a consolidated 3D surface of the face from a plurality of 2D images of the face such as the image 21, taken by a camera at different respective viewing angles. Each of these images is subjected to the 3D reconstruction method according to steps 202 to 205 of FIG. 2. In other words, the implementation of the method of FIG. 2 can be repeated to obtain respective reconstructed 3D surfaces. These reconstructed 3D surfaces can then be combined, in step 206, using the relative 3D position of the camera that took the picture of the face as presented on each 2D image as well as the estimation of the 2D area of said 2D image wherein the toothed portion of the face is located. The consolidated 3D surface of the face which is obtained by this type of implementation from a plurality of 2D images of the subject's face is a 3D reconstruction of the face and of the teeth that is more precise than that obtained from a single 2D image of said face.

In a second embodiment, which will now be described with reference to FIG. 3, the generating of the 3D surface of the face comprises the implementation of another deep learning algorithm 43 capable of predicting a 3D reconstruction from a 2D image, which differs from the deep learning algorithms 41 and 42 of the embodiment of FIG. 2. This other algorithm is adapted to produce overall a 3D reconstruction of the toothed portion 1 and of the facial portion 4 without the toothed portion, from the second part 24 of the 2D image to which the first part 22 of said enhanced 2D image is added, with mutual registration of said second part of the 2D image and of said first part of said enhanced 2D image. This third algorithm 43 can be derived from the algorithm 42 used in step 203 of the embodiment illustrated by FIG. 2.

The first step 301 and the second step 302 of the embodiment according to FIG. 3 are identical, the first step 201 and the second step 202, respectively, of the embodiment according to FIG. 2. Furthermore, the third step 303 of the embodiment of FIG. 3 corresponds to step 304 of the embodiment of FIG. 2. Thus, the first step 301 corresponds to the taking of a 2D image of the face of a patient with a visible toothed portion 1. The second step 302 is the step of segmenting the acquired 2D image, into a first part 22 corresponding to the toothed portion alone, and a second part 24 corresponding to the facial part 4 except for the toothed portion 1. And the third step 303 comprises the enhancement processing of the part 22 of the image corresponding to the toothed portion 1, which makes it possible to produce an enhanced version 23 of said image 22. These steps 301, 302 and 304 are therefore not described again in detail here.

The rest of the steps of the implementation of the method according to FIG. 3, however differ from the implementation according to FIG. 2.

Specifically, in step 304, the enhanced image 23 which corresponds to the image 22 of the toothed portion alone to which specific processing has been applied in order to enhance the photometric characteristics, is reinjected into the original 2D image 21. More particularly, this result can be obtained by merging the enhanced image 23 and the part 24 of the original 2D image 21 corresponding to the facial part 4 except for the toothed portion 1 of the face, by a merging algorithm 52. The result of this merging is a re-merged two-dimensional image 25, wherein the toothed portion 1 is enhanced. In other words, the image 25 produced by the merging algorithm 52 is always a 2D image, such as the original image 21, but it differs in that the toothed portion 1 of the face is enhanced.

Then, in step 305, the facial reconstruction and the reconstruction of the toothed portion are carried out by the common implementation of a three-dimensional reconstruction algorithm 43, applied to the re-merged two-dimensional image 25 wherein the toothed portion 1 is enhanced. This algorithm may deviate from the algorithm 42 used in step 303 of the implementation of the method according to FIG. 2, but on the condition of adding the image of a toothed portion with enhanced texture into the training data. According to the learning process described above in relation to the algorithm 42 of FIG. 2, it is possible under this condition to use the same training database to train the network 43 to be predicted, from 2D images of faces with an enhanced toothed portion, the total 3D surface comprising the textured toothed portion. In other words, the algorithm implemented by the deep learning network 43 implements a 3DMM method applied to the re-merged 2D image 25, which is adapted to deform a generic 3D surface so as to approximate the 2D image on the photometric plane. To best approximate the 2D image, the algorithm 43 may be based on a metric proximity metric between the deformed 3D model and the initial 2D image, in connection with an optimization process based on this metric.

With reference, for example, to the principle of the scientific article by Deng et al. already cited above, the total reconstructions (of an image with a facial part and with a toothed portion) exhibiting an enhanced texture on the teeth, are registered together. Restricted parameterization is then implemented on these registered data in order to best account for inter-individual deformations. At the output of this process, the deformations are parameterized by a number K total of deformation parameters greater than the number K face of parameters of the algorithm 42 of FIG. 2, which indicates the face and the teeth. Once the deep learning network 43 has been trained, it is capable of reconstructing, for any 2D facial image or not comprising a toothed portion, the corresponding 3D surface.

As a person skilled in the art will understand, the modification of the photometric characteristics of the first part 22 of the original 2D image 21 which is generated in the step of enhancement 204 of FIG. 2 as in step 303 of FIG. 3 comprises sharpening and/or increasing the contrast of said first part 22 of the 2D image.

According to a first exemplary implementation, illustrated by the functional diagram of FIG. 4, the enhancement of the toothed portion of the 2D image can be carried out using a series of purely photometric filters.

More particularly, the 2D-level enhancement processing 54 which is applied to the toothed portion 1 comprises:
in step 401, the extraction of the blue channel from the color image coded in RGB format;
high-pass contrast enhancement filtering 402 applied to the blue channel extracted in step 401; and thus
in step 403, a local equalization filtering of the CLAHE histogram type applied to the filtered blue channel which is obtained by step 402.

Regarding step 401, the person skilled in the art will appreciate that the blue channel is, on the spectral plane, the one which contains the most contrast on dental tissue.

Furthermore, in one example, the high-pass contrast enhancement filtering applied in step 402 to the blue channel may comprise a sharpening algorithm applied to the blue channel. Such an algorithm consists of partially subtracting from the blue channel a blurred version of itself, which has the effect of accentuating the details of high spatial frequency.

Finally, the local histogram equalization filtering of step 403 can for example be of the CLAHE type, as described in the section by Karel Zuiderveld "*Contrast Limited Adaptive Histogram Equalization*", in the book Graphics Gems IV, edited by P. Heckbert, Cambridge, MA (Academic Press, new York), August 1994, pp. 474-485.

According to a second exemplary implementation, illustrated by the functional diagram of FIG. 5, the enhanced version 23 of the first part 22 of the original two-dimensional image 21 corresponding to the toothed portion of the image 21 can be obtained from said original 2D image 21, as an intermediate output of a depth map deep learning network 50, having a higher contrast than the original 2D image according to a determined quantitative criterion. The person skilled in the art will appreciate that it is perfectly accepted that the deep learning network 50, applied to a non-enhanced image, can produce as output only depth maps that are not usable as such, but that this does not prevent the use of its intermediate outputs such as those of a contrast enhancer in accordance with implementations of the invention, notwithstanding the fact that its outputs are not usable and are actually not used.

The deep learning architecture 50 is for example a convolutional neural network (CNN) which may have an entirely conventional structure. This type of CNN is available in open-access libraries known to a person skilled in the art. At the input, the two-dimensional image 21 is provided in the form of a matrix of pixels. The color is coded by a third dimension, of depth equal to 3, in order to represent the fundamental colors [Red, Green, Blue].

The CNN of FIG. 5 is in fact an FCN (Fully Convolutional Network) inspired by the article by the scientific article already mentioned earlier, by J. Long, et al., "Fully convolutional networks for semantic segmentation", IEEE Conference on Computer Vision and Pattern Recognition (CVPR), Boston, MA, 2015, pp. 3431-3440. This FCN comprises two distinct parts, according to an encoding/decoding architecture.

The first part of the encoding FCN is the convolutional part itself. It comprises the convolutional processing layer 51, which has a succession of filters, or "convolution kernels", applied in strata. The convolutional processing layer 51 functions as an extractor of characteristics of the 2D images advised to the input of the CNN. In the example, the input image 21 is passed through the succession of convolution kernels, creating each time a new image called a convolution map. Each convolution kernel has two convolution layers 511 and 512, and a layer 513 of reducing the resolution of the image by a pooling operation also called local maximum operation (or "max pooling").

The output of the convolutional part 51 is then provided at the input of a final convolution layer 520 capturing all the visual action field of the previous layer, and thus mimicking a fully connected layer.

Finally, a final deconvolution layer 530 produces a depth map 22' at the output. As has already been said, this type of CNN is unfortunately not suitable for the 3D reconstruction of the toothed portion 1 in the image 22, due to the high specularity and low texture of the teeth. This is why the depth map 22' generated by this network 50 is not usable for the envisaged application.

On the other hand, each convolution kernel of the convolutional processing layer 51 of the network 50 is adapted to extract determined photometric characteristics of the 2D image allowed at the input of the CNN. In other words, each kernel generates a convolution map in the form of a new image constituting a version of the input image that is enhanced from the point of view of said characteristics.

Thus, the enhanced image 23 corresponding to the enhanced version of the image 21 at the input of the deep learning network 50 can be extracted as a determined intermediate output of said network 50, having a higher contrast than the original 2D image according to a determined quantitative criterion. This intermediate output can be selected from the outputs of the convolution kernels by a selection engine 52, on the basis of the values of a contrast metric which are respectively associated with the output of each of the convolution kernels of each convolution layer of the network 50. For example, the selected intermediate output of the network 50 can be the output of the kernel of the convolutional processing layer 51 of said network which shows the highest contrast with respect to the metrics associated with the respective intermediate outputs of the network, that is, at the outputs of the respective kernels of the layer 51. The image delivered by this intermediate output has a higher contrast than the original 2D image 21 provided at the input of the CNN.

The invention which has been described in the foregoing makes it possible to make facial reconstruction possible with a toothed portion based on any single 2D image, or on any series of any 2D images. In the latter case, several images are taken from different viewing angles, and a final multi-view stereoscopic reconstruction procedure is carried out in order to produce a more precise 3D reconstruction of the face and of the teeth.

The method finds very varied applications, in particular in the simulation of dental treatments having aesthetic implications.

Thus, for example, the functional diagram of FIG. 6 illustrates an example of a method for simulating the aesthetic result of an aesthetic, orthodontic or prosthetic dental treatment that is projected for a human subject, i.e., a patient, from at least one two-dimensional (2D) color image of the subject's face with a visible toothed portion. In this example, the envisaged treatment is an aesthetic treatment consisting of whitening the teeth.

The method comprises:
the three-dimensional reconstruction 60, from a 2D image of origin 71 of the face of the patient with a visible toothed portion (or a plurality of such images), in order to obtain a single reconstructed three-dimensional surface 73 of the toothed portion 1 and of the facial portion 4 without the toothed portion of the face by the method as described in the foregoing;
the obtaining 61 of a three-dimensional reconstruction 75 of the patient's dental arch, at least the portion 1 of said dental arch concerned by the projected treatment, and which is visible in the original 2D image 71;
the substitution 63 at the zone of the three-dimensional surface 73 corresponding to the toothed portion 1 of the face in the original 2D image 71, of another three-dimensional surface 77 corresponding to the toothed portion 2 as it would be after said projected treatment; and,
the display of the three-dimensional surface 73 of the face with the toothed portion 2 as it would be after the projected treatment.

In one example, the three-dimensional reconstruction 75 of the patient's dental arch 1 that is obtained in step 61 may be a 3D reconstruction of the patient's complete arch. This 3D reconstruction can for example be reconstructed by an intraoral 3D scanner (IOS) 72. In one variant, the three-dimensional reconstruction 75 of the patient's dental arch 1 can be obtained by Cone Beam Computed Tomography (CBCT) volumetric imaging. CBCT is a computed tomography technique for producing a digitized X-ray image, located between the dental panoramic and the scanner.

In a step 62, a dental practitioner (such as a dental surgeon or an orthodontist, for example) produces a dental treatment plan 74. Consequently, the dental arch 1 undergoes automatic or manual digital processing which generates a simulation 2 of said dental arch after treatment. Then, the processed dental arch 2 (here potentially called the whitened dental arch), is adjusted on the toothed portion of the three-dimensional surface 73 of the patient's face, in order to simulate within said 3D surface the aesthetic result of the projected treatment 74.

Indeed, in step 63, the three-dimensional surface 77 of the toothed portion 2 as it would appear after the projected dental treatment, here a whitening of the teeth, is registered on the toothed portion of the three-dimensional reconstruction 73 of the patient's face, thanks to a registration algorithm 76. Thus, it replaces, within the three-dimensional reconstruction 73 of the patient's face, the toothed portion 1 which is visible in the original 2D image 71. In other words, the registration algorithm 76 which is applied to a three-dimensional reconstruction 77 of the dental arch is adapted to adjust the whitened dental arch 2 on the toothed portion of the three-dimensional surface 73 of the patient's face as obtained by the method according to the first aspect of the invention. This allows the patient to assess the relevance of the projected dental treatment 74 from the viewpoint of aesthetics, based on an overall view 73 of their face with the toothed portion such as would be after said projected dental treatment.

The display of the three-dimensional surface 73 of the face with the toothed portion 2 as it would be after the projected treatment may be a 3D display, for example in 3D software of the Meshlab™ type (which is free software for processing 3D meshes), in CAD ("Computer-Aided Design") software. It may also be the display of a 2D image, or a display on virtual reality glasses, or on augmented reality glasses. These examples are not limiting.

The example of whitening the teeth does not limit the dental treatments that can be simulated thanks to the method as described above with reference to FIG. 6. Furthermore, several processing operations can be simulated simultaneously. Thus, the projected treatment may comprise at least one of the following esthetic, orthodontic or prosthetic treatments of: a change in hue of the teeth, a realignment of the teeth, a position of facets on the teeth, a placement of orthodontic (braces) or prosthetic materials (crown, bridge, inlay core, inlay onlay), etc.

More generally speaking, the present invention has been described and illustrated in this e present detailed description and in the figures of the accompanying drawings, in possible embodiments. The present invention is not, however, limited to the embodiments presented. Other variants and embodiments can be deduced and implemented by a person skilled in the art on reading the present description and the accompanying drawings.

In the claims, the term "comprising" or "including" does not exclude other elements or other steps. A single processor or several other units can be used to implement the invention. The various features presented and/or claimed can advantageously be combined. Their presence in the description or in different dependent claims does not exclude this possibility. The reference signs cannot be understood as limiting the scope of the invention.

The invention claimed is:

1. A three-dimensional (3D) reconstruction method for obtaining, from at least one two-dimensional (2D) color image of a human face with a visible toothed portion, a single reconstructed 3D surface of the toothed portion and of the facial portion without the toothed portion of the face, said method comprising:
    segmenting the 2D image into a first part corresponding to the toothed portion of the face only by masking in the 2D image of the facial portion without the toothed portion of the face, on the one hand, and a second part corresponding only to the facial portion, without said toothed portion, of the face by masking in the 2D image the toothed portion of the face, on the other hand;
    enhancing the first part of the 2D image to modify the photometric characteristics of said first part;
    generating a 3D surface of the face reconstructed from the enhanced first part of the 2D image, on the one hand, and from the second part of said 2D image, on the other hand, said 3D surface of the face being adapted for the simulation of a projected treatment to be applied to the toothed portion of the face, by substituting, on the area of the 3D surface corresponding to said toothed portion, another 3D surface corresponding to said toothed portion after said projected dental treatment, said generating of the 3D surface of the face comprising:
    an implementation of a first deep learning algorithm adapted to produce a 2D depth map representing a 3D reconstruction of the toothed portion of the face based on the first part of the enhanced 2D image, the first deep learning algorithm being adapted to predict a depth map for the toothed portion of the face from training data by masking a depth map associated with the 2D image with the same mask as a mask used on the 2D image to obtain the first part of the 2D image corresponding to the toothed portion of the face, and wherein the depth map for the toothed portion of the face is converted into a 3D reconstruction that is merged with the 3D reconstruction of the facial portion without the toothed portion of the face to produce the 3D surface of the face;
    an implementation of a second facial reconstruction deep learning algorithm, adapted to produce a textured 3D reconstruction of the facial portion without the toothed portion of the face based on the second part of the 2D image; and,
    an algorithm for merging the 3D reconstruction of the toothed portion and the textured 3D reconstruction of the facial part of the 2D image of the 2D image, to obtain the 3D surface of the face with its toothed portion.

2. The method according to claim 1, wherein the second deep learning algorithm is based on a method of the generating 3D pose via a 3D morphable model method type adapted to deform a generic 3D surface so as to approximate the 2D image on the photometric plane.

3. The method according to claim 2, wherein the second algorithm is furthermore adapted to produce the relative 3D position of the camera that took the picture of the face as presented on the 2D image as well as an estimation of the 2D area of said 2D image wherein the toothed portion of the face is located, and wherein a consolidated 3D surface of the face is obtained from a plurality of 2D images of the face taken by a camera according to different respective viewing angles and for each of which the steps of segmenting, enhancing and generating are repeated to obtain respective reconstructed 3D surfaces, said reconstructed 3D surfaces being combined using the relative 3D position of the camera that took the picture of the face as presented on each 2D image as well as the estimation of the 2D area of said 2D image wherein the toothed portion of the face is located.

4. The method according to claim 1, wherein the generating of the 3D surface of the face comprises the implementation of a third deep learning algorithm, different from the first and second deep learning algorithm and adapted to produce overall a 3D reconstruction of the toothed portion and of the facial portion without the toothed portion based on the second part of the 2D image to which the first part of said enhanced 2D image is added with mutual registration of said second part of the 2D image and of said first part of said enhanced 2D image.

5. The method according to claim 4, wherein the third deep learning algorithm is based on a method of the generating 3D pose via a 3D morphable model method type adapted to deform a generic 3D surface so as to approximate on the photometric plane the second part of the 2D image to which the first part of said enhanced 2D image is added.

6. The method according to claim 1, wherein modifying the photometric characteristics of the first 2D portion of the image comprises sharpening or increasing the contrast of said first part of the 2D image.

7. The method according to claim 6, wherein the enhancement of the toothed portion of the 2D image is carried out using a series of purely photometric filters.

8. The method according to claim 7, wherein the enhancement 2D processing comprises the extraction of the blue channel, a high-pass contrast enhancement filtering applied to the extracted blue channel, as well as a local histogram equalization filtering, for example of the Contrast Limited Adaptive Histogram Equalization type, applied to the filtered blue channel.

9. The method according to claim 8, wherein the contrast enhancement high-pass filtering applied to the blue channel comprises a sharpening algorithm, consisting for example of partially subtracting from said blue channel a blurred version of itself.

10. The method according to claim 6, wherein the first portion of the enhanced 2D image is produced from the original 2D image as an intermediate output of a semantic segmentation deep learning network, having a higher contrast than the selected original 2D image according to a determined quantitative criterion.

11. The method according to claim 10, wherein a contrast metric is associated with the output of the convolution kernel of each of the convolution layers of the semantic segmentation deep learning network, and wherein the selected intermediate output of the semantic segmentation deep learning network is the output demonstrating the highest contrast with respect to the metrics associated with the respective intermediate outputs of said deep semantic segmentation network.

12. A computer program product comprising one or more sequences of instructions stored on a machine-readable memory medium configured to be run on a processor, said sequences of instructions being adapted to perform a method for obtaining, from at least one two-dimensional (2D) color image of a human face with a visible toothed portion, a single reconstructed 3D surface of the toothed portion and of the facial portion without the toothed portion of the face when the program is read in the memory medium and executed by the processor, said method comprising:

segmenting the 2D image into a first part corresponding to the toothed portion of the face only by masking in the 2D image of the facial portion without the toothed portion of the face, on the one hand, and a second part corresponding only to the facial portion, without said toothed portion, of the face by masking in the 2D image the toothed portion of the face, on the other hand;

enhancing the first part of the 2D image to modify the photometric characteristics of said first part;

generating a 3D surface of the face reconstructed from the enhanced first part of the 2D image, on the one hand, and from the second part of said 2D image, on the other hand, said 3D surface of the face being adapted for the simulation of a projected treatment to be applied to the toothed portion of the face, by substituting, on the area of the 3D surface corresponding to said toothed portion, another 3D surface corresponding to said toothed portion after said projected dental treatment, said generating of the 3D surface of the face comprising:

an implementation of a first deep learning algorithm adapted to produce a 2D depth map representing a 3D reconstruction of the toothed portion of the face based on the first part of the enhanced 2D image, the first deep learning algorithm being adapted to predict a depth map for the toothed portion of the face from training data by masking a depth map associated with the 2D image with the same mask as a mask used on the 2D image to obtain the first part of the 2D image corresponding to the toothed portion of the face, and wherein the depth map for the toothed portion of the face is converted into a 3D reconstruction that is merged with the 3D reconstruction of the facial portion without the toothed portion of the face to produce the 3D surface of the face;

an implementation of a second facial reconstruction deep learning algorithm, adapted to produce a textured 3D reconstruction of the facial portion without the toothed portion of the face based on the second part of the 2D image; and, an algorithm for merging the 3D reconstruction of the toothed portion and the textured 3D reconstruction of the facial part of the 2D image of the 2D image, to obtain the 3D surface of the face with its toothed portion.

13. A method of simulating the aesthetic result of a projected dental treatment for a human subject, from at least one two-dimensional, 2D, color image of the subject's face with a visible toothed portion, said method comprising:

a three-dimensional (3D) reconstruction, from the 2D image, of the face with the toothed portion, to obtain a single 3D surface of the toothed portion and of the facial portion without the toothed portion of the face reconstructed by a method for obtaining, from at least one two-dimensional (2D) color image of a human face with a visible toothed portion, a single reconstructed 3D surface of the toothed portion and of the facial portion without the toothed portion of the face, said method comprising:

segmenting the 2D image into a first part corresponding to the toothed portion of the face only by masking in the 2D image of the facial portion without the toothed portion of the face, on the one hand, and a second part corresponding only to the facial portion, without said toothed portion, of the face by masking in the 2D image the toothed portion of the face, on the other hand;

enhancing the first part of the 2D image to modify the photometric characteristics of said first part;

generating a 3D surface of the face reconstructed from the enhanced first part of the 2D image, on the one hand, and from the second part of said 2D image, on the other hand, said 3D surface of the face being adapted for the simulation of a projected treatment to be applied to the toothed portion of the face, by substituting, on the area of the 3D surface corresponding to said toothed portion, another 3D surface corresponding to said toothed portion after said projected dental treatment, said generating of the 3D surface of the face comprising:

an implementation of a first deep learning algorithm adapted to produce a 2D depth map representing a 3D reconstruction of the toothed portion of the face based on the first part of the enhanced 2D image, the first deep learning algorithm being adapted to predict a depth map for the toothed portion of the face from training data by masking a depth map associated with the 2D image with the same mask as a mask used on the 2D image to obtain the first part of the 2D image corresponding to the toothed portion of the face, and wherein the depth map for the toothed portion of the face is converted into a 3D reconstruction that is merged with the 3D reconstruction of the facial portion without the toothed portion of the face to produce the 3D surface of the face;

an implementation of a second facial reconstruction deep learning algorithm, adapted to produce a textured 3D reconstruction of the facial portion without the toothed portion of the face based on the second part of the 2D image; and, an algorithm for merging the 3D reconstruction of the toothed portion and the textured 3D reconstruction of the facial part of the 2D image of the 2D image, to obtain the 3D surface of the face with its toothed portion;

a substitution on the area of the 3D surface corresponding to the toothed portion of the face of another 3D surface corresponding to said toothed portion after said projected treatment; and, a displaying of the 3D surface of the face with the toothed portion after the projected dental treatment.

14. The method according to claim 13 comprising an implementation of an algorithm applied to a 3D reconstruction of a subject's dental arch, said algorithm being adapted to register a dental arch on the toothed portion of the 3D surface of the face, and to replace the toothed portion within said 3D surface of the face with a corresponding part of said 3D reconstruction of the subject's dental arch.

15. The method according to claim 14, wherein the dental arch undergoes digital processing before registration on the toothed portion of the 3D surface of the face, in order to simulate, within said 3D surface of the face, the aesthetic result of the projected treatment.

16. The method according to claim 14, wherein the 3D reconstruction of the subject's dental arch is obtained with an intraoral camera.

17. The method according to claim 13, wherein the projected treatment comprises at least one of the list of following aesthetic, orthodontic or prosthetic treatments: a change in hue of the teeth, a realignment of the teeth, an affixing of veneers onto the teeth, a placement of orthodontic material such as braces, or a prosthetic material placement such as a crown, a bridge, an inlay core or an inlay-onlay.

* * * * *